C. W. VALLIERE.
DRINKING FOUNTAIN.
APPLICATION FILED NOV. 7, 1912.
1,101,720.
Patented June 30, 1914.
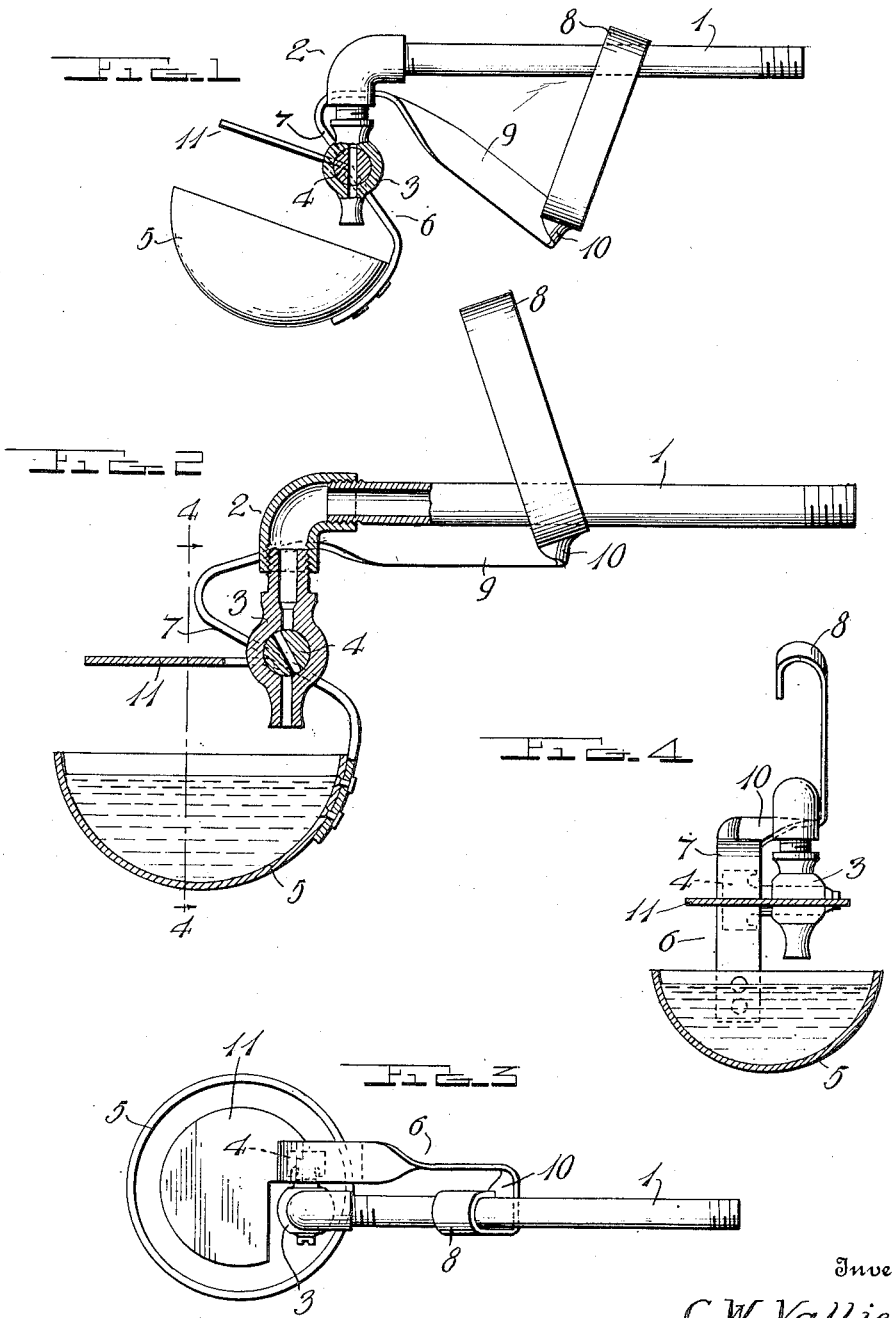
Inventor
C. W. Valliere

UNITED STATES PATENT OFFICE.

CHARLES W. VALLIERE, OF EAST AUBURN, CALIFORNIA.

DRINKING-FOUNTAIN.

1,101,720. Specification of Letters Patent. Patented June 30, 1914.

Application filed November 7, 1912. Serial No. 730,056.

*To all whom it may concern:*

Be it known that I, CHARLES W. VALLIERE, a citizen of the United States, residing at East Auburn, in the county of Placer and State of California, have invented certain new and useful Improvements in Drinking-Fountains; and I do declare the following to be a full, clear, and exact description of the invention, such as will enable others skilled in the art to which it appertains to make and use the same.

This invention relates to improvements in drinking troughs or fountains and more especially to those designed for poultry in which the trough is pivotally suspended and provided with means whereby when the trough is full of water the supply will be automatically cut off and when the supply of water in the trough is materially reduced the trough will tip and automatically open a valve to permit water to again flow into the trough to fill it.

The invention contemplates improved means for suspending the trough whereby the supply controlling valve is operated by the amount of water in the trough.

With these and other objects in view, the invention consists of certain novel features of construction, and the combination and arrangement of parts as will be more fully described and claimed.

In the accompanying drawings; Figure 1 represents a side elevation of a water supply pipe with this improved fountain mounted thereon; Fig. 2 is a transverse vertical section thereof; Fig. 3 is a top plan view of the device; Fig. 4 is a vertical section taken on the line 4—4 of Fig. 2.

In the embodiment illustrated a delivery pipe or spout 1 is shown which may be connected with a suitable source of supply, said pipe being shown at its rear end provided with a screw threaded portion for entering the wall of a supply tank not shown. The front or free end of the spout is bent downwardly as shown at 2 and has a rotary valve 3 of any suitable or desired construction mounted transversely therein with a stem 4 projecting laterally at one side thereof.

The trough or fountain 5 of any suitable or desired shape has a handle or attaching member 6 fixed to one side thereof, said handle being here shown in the form of a metal strip of suitable thickness which is riveted at one end to the fountain 5 and extended upwardly and bent forwardly to form an upright arm 7 which is secured to the stem 4 of the valve 3. This handle 4 is then bent at right angles and extended rearwardly a suitable distance and is provided at its free end with a loop or hook 8 for engagement with the pipe 1 for limiting the upward or downward movement of the trough or fountain. This hook or stop 8 is formed by bending the strip laterally at right angles to the longitudinal arm 9 to form an arm 10 extending to one side of said arm 9 and the strip is then bent upwardly at right angles to the arm 10 and its terminal bent downward to form a hook which is disposed over the pipe 1 and adapted to engage said pipe when the trough is almost empty for limiting its upward movement which causes the opening of the valve 3. When the trough is filled with water it swings downward until the arm 10 engages the lower face of the pipe 1 which limits the downward movement of said trough and holds it in position readily accessible to the poultry.

A guard 11 extends forwardly from the arm 7 over the trough 5 being spaced thereabove a suitable distance to permit the fowls to insert their heads into the trough and to prevent them from getting bodily into the trough and also to prevent chicks from falling into the trough and drowning. This guard is shown in the form of a disk but may be of any desired configuration and is fixed at one edge to the front face of said arm 7 and is of a size less than the upper face of the trough or fountain.

In the use of this invention the trough being suspended from the valve stem will operate said stem to open and close the valve according to the quantity of water contained in the trough. When the water is reduced to a certain level or the trough entirely empty the weight of the handle 6 is sufficient to cause the trough to swing upwardly thereby turning the valve 3 in a direction to open it and thus permit the water from the spout 1 to flow into the trough and fill it and when full or nearly full the weight of the trough with the water will overbalance the handle 6 and thereby turn the valve stem 4 and close the valve.

By reason of the particular formation of the handle 6 which is made of a metal strip and is hence yielding throughout its length, the terminal hooked end of said handle may be sprung laterally and disengaged from the horizontal supply pipe 1. This permits the trough 5 to be entirely discharged of water together with any foreign accumulations that may have gained access to said trough.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents as circumstances may suggest or render expedient.

Having thus described my invention, what I claim is:

1. The combination with a horizontal supply pipe and a spout thereon provided with a rotary valve, the latter having a laterally projecting stem, a resilient arm yieldable throughout its length and secured intermediate its ends to said stem, a trough supported on the lower end of said arm and disposed beneath the spout, said trough when empty being overbalanced by the weight of the upper end of the arm, stops carried by said upper end of the arm and co-acting with the horizontal pipe to limit the tilting movement of the trough, said upper end of the arm being adapted to be sprung laterally to bring the stops thereon out of the plane of said pipe and permit the trough to be entirely relieved of all contents.

2. The combination with a horizontally disposed supply pipe and a downwardly disposed discharge spout thereon containing a rotary valve, the stem of the valve projecting laterally, of a trough disposed below the valve, a resilient metal strip yieldable throughout its length and secured at one of its ends to the rear of said trough and extending obliquely over the same and then bent laterally outward and twisted, the face end of said twisted portion of the strip having a lateral extension with an upturned arm at the free extremity thereof provided with a hooked terminal, said obliquely extending portion of the strip being fixed to the stem of the valve whereby the trough is supported for tilting movement, and said upturned arm being disposed to one side of the horizontal supply pipe and its ends co-acting therewith to limit the swinging movement of the trough, said arm being adapted to be sprung laterally to the opposite side of said pipe to permit the trough to be relieved of its contents, and a guard plate of less size than the top of the trough and spaced horizontally above the same, said plate being rigidly secured to the strip to move with the same and the trough.

3. The combination with a supply pipe and a spout provided with a rotary valve having a stem extending laterally through one side of the spout, of a trough located below said valve and suspended from the stem of the valve, a handle formed from a resilient metal strip for suspending and holding said trough in position, the lower portion of said handle being secured to the trough and to the stem of the valve, said handle having a yieldable arm projecting upwardly and provided with a hooked terminal for engagement with the pipe when the trough is to be filled with a fresh supply of water, the hook being adapted to be sprung laterally from its engagement with the pipe to permit the trough to be entirely relieved of all contents.

4. The combination with a supply pipe and a spout provided with a rotary valve having a stem extending laterally through one side of the spout, of a trough located below said valve and suspended from the stem of the valve, a handle formed from a metal strip for suspending and holding said trough in position, the lower portion of said handle being secured to the trough and to the stem of the valve, said handle having an arm projecting upwardly and provided with a hooked terminal for engagement with the pipe when the trough is to be filled with a fresh supply of water, the hook being adapted to be sprung laterally from its engagement with the pipe to permit the trough to be entirely relieved of all contents, and a plate extending laterally from said handle and over said trough, said plate conforming to the shape of the top of the trough and being of less diameter than the same to space the edge thereof inward from the edge of the trough.

In testimony whereof I have hereunto set my hand in presence of two subscribing witnesses.

CHARLES W. VALLIERE.

Witnesses:
J. M. O'CONNOR,
F. PEREZ.